Dec. 27, 1938.　　　G. A. SWENSON　　　2,141,566
STONE-CUTTING APPARATUS
Filed March 7, 1938　　　2 Sheets—Sheet 1
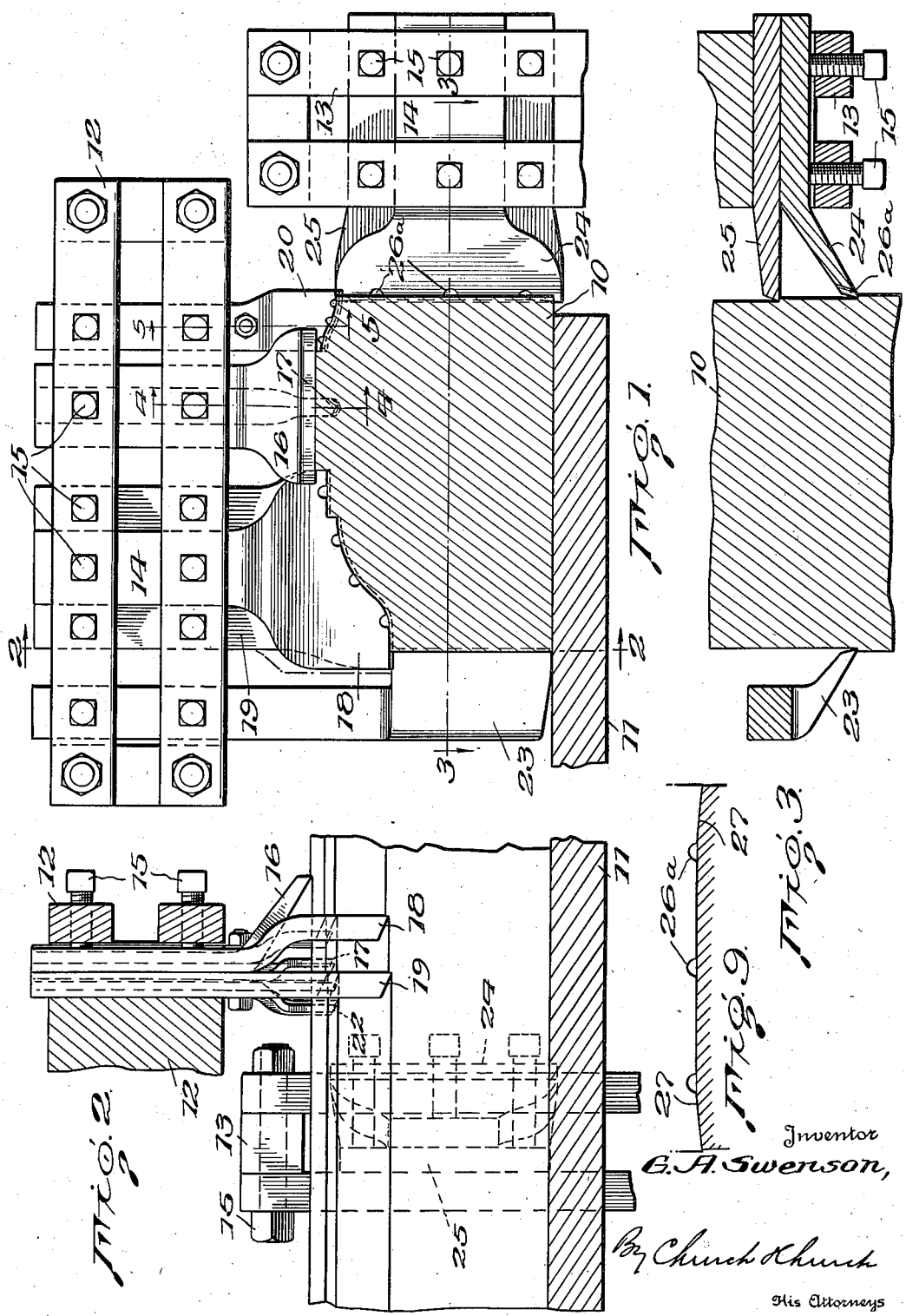

Dec. 27, 1938.  G. A. SWENSON  2,141,566
STONE-CUTTING APPARATUS
Filed March 7, 1938  2 Sheets-Sheet 2
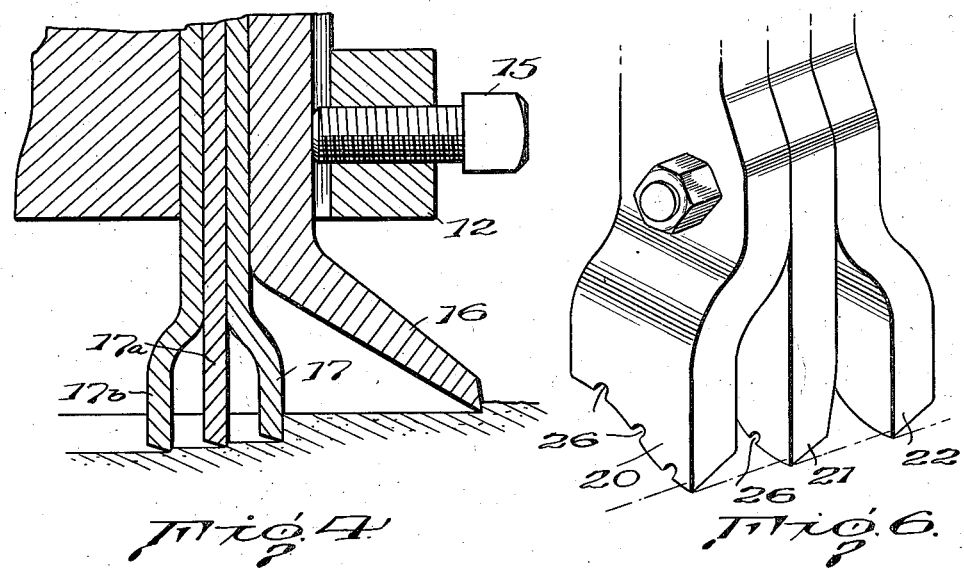
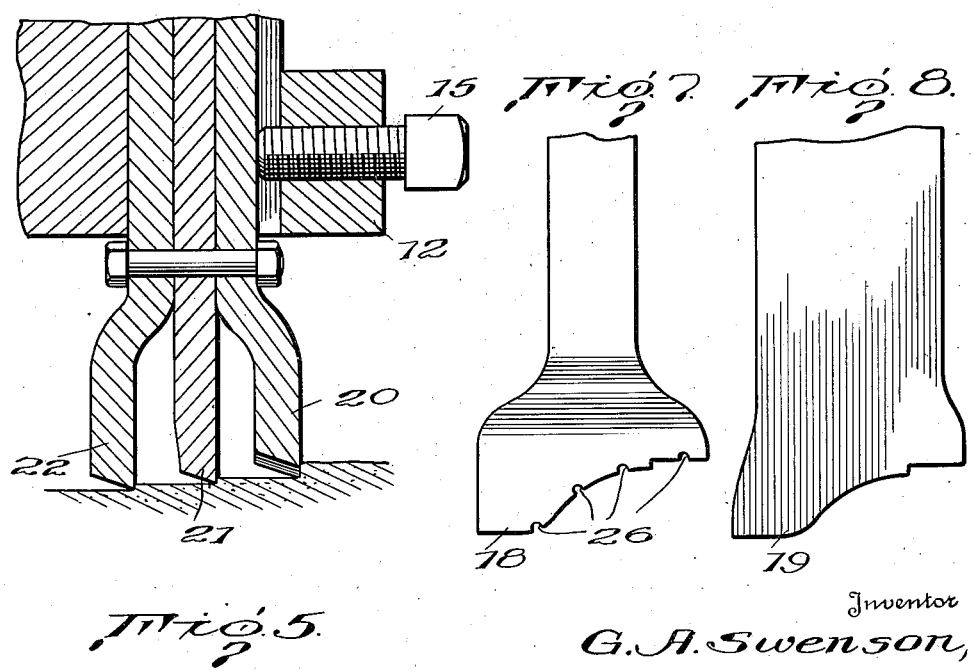
Inventor
G. A. Swenson,
By Church & Church
His Attorneys Patented Dec. 27, 1938

2,141,566

UNITED STATES PATENT OFFICE 2,141,566

STONE-CUTTING APPARATUS

Gustave A. Swenson, Champaign, Ill.

Application March 7, 1938, Serial No. 194,493

5 Claims. (Cl. 125—38)

This invention relates to stone working apparatus and, particularly, to a multiple tool machine for planing and cutting stone.

The primary object of the invention is to provide a stone planing and cutting machine with which the surfaces of stones may be dressed or reduced to the desired pattern or design in a considerably shorter period of time than has heretofore been practical with stone working machines of the prior art.

Another object of the invention is to provide a stone planing and cutting apparatus having multiple tools arranged in sets, with the tools of each set in tandem relationship, the tools of the respective sets being of varying length or depth, so that each tool in any one set will cut a little deeper into the surface of the stone than the tool next in advance of it in its individual set of tools. In the present machine, these sets of tandem-arranged tools are so arranged with respect to each other that a number of sets of tools will engage the top face of a stone to be operated upon, and additional tools will also engage the side faces of the stone, so that, by reciprocating the support on which the stone is held relatively to the several tools, the stone may be dressed or cut to the desired pattern merely by reciprocating the stone support without interrupting the operation or removing any of the tools. With the tools arranged in sets of tandem formation, the time required for cutting and planing the stone to the desired pattern is reduced 25% to 50%.

A still further object of the invention is to provide a multiple cutting and planing tool for stone working apparatus with which a cut of substantial depth can be made where considerable rough is to be taken off the stone, without danger or liability of the stone chipping off to a depth beyond or below the line or prospective surface of the pattern. More specifically, the invention contemplates a set of tools, usually two or three, arranged in tandem formation with the front or forward tool in the set provided with recesses in its cutting edge and the rear tool of the set formed with an uninterrupted edge. Where more than two tools are used in a set, one or more of the intermediate tools may also be formed with recessed cutting edges, but where this is done, the recesses in each tool edge should be staggered with respect to the recesses in the other cutting edges in the set.

With these and other objects in view, the invention consists in certain details of construction and combinations and arrangements of parts, all as will hereinafter be more fully described, and the novel features thereof particularly pointed out in the appended claims.

In the accompanying drawings—

Figure 1 illustrates the tools and their mountings in front elevation, the stone being operated upon, and the traveling bed of planer for supporting the stone being shown in cross section;

Fig. 2 is a vertical sectional view on the line 2—2 of Fig. 1;

Fig. 3 is a horizontal sectional view on the line 3—3 of Fig. 1;

Fig. 4 is a vertical sectional view on the line 4—4 of Fig. 1;

Fig. 5 is a similar view on the line 5—5 of Fig. 1;

Fig. 6 is a perspective view of the set of tools shown in Fig. 5;

Figs. 7 and 8 are front elevational views of the tools comprising the set of tools shown in engagement with the top right-hand edge of the stone in Fig. 1; and Fig. 9 is a detail elevation of the cutting edge of one of the tools.

Referring particularly to Figs. 1 to 3, the stone 10 is supported upon a bed or base 11, which is adapted to be reciprocated by a mechanism (not shown) to move the stone back and forth with respect to the tools which cut and reduce the surface of the stone both at its top and two opposite sides to the desired cross-sectional pattern. The tools for cutting or planing the top surface and one side surface of the stone are rigidly mounted in a support 12, while the tools for cutting or planing the other side surface are rigidly mounted in a support 13. The tools for cutting and planing the top surface are arranged in sets of two or more tools, with the tools of each set arranged in tandem formation longitudinally of the path of movement of the stone. While the number of tools used in each set may be varied, in the present instance a set of two tools is illustrated as operating upon one side edge portion of the upper surface of the stone, while a second set of three tools is used in the present instance for planing and cutting the opposite side edge portion of the upper surface of the stone and, located intermediate these two sets of tools, there is another set consisting of a finishing tool and three raglet tools arranged one behind the other in tandem formation. In this connection, it will be noted that the finishing tool of the intermediate or third-mentioned set of tools has its side edge portions overlapping, so to speak, the tools of the two sets at the opposite sides thereof, so that the three sets of tools in conjunction with one another operate upon the entire top surface of the stone in reducing the same to the desired cross-sectional shape. Each tool is provided with an elongated shank portion 14 which projects into its tool support in which it is clamped by comparatively heavy screws 15.

The intermediate set of tools is shown in cross-section in Fig. 4, and consists, as previously mentioned, of the finishing tool indicated at 16, and three raglet tools 17, 17a, 17b, the finishing tool being offset forwardly to position its cutting edge somewhat in advance of the raglet tools. The raglet tools themselves are also spaced apart somewhat adjacent their cutting edges by having the forward and rearward tools 17 and 17b formed with offsets adjacent the lower ends of their shank portions. It will also be noted in Fig. 4 that each tool in this intermediate set of tools has its cutting edge located somewhat below the cutting edge of the tool next in advance thereof, so as the stone is advanced with respect to the tools, a cut of increasing depth will be formed by the successive tools of the set.

The set of tools operating upon the left-hand upper surface of the stone, as viewed in Fig. 1, is shown in side or edge elevation in Fig. 2. This set consists of the forward tool 18, and a rear tool 19, the forward tool having an offset at its shank portion to position it in advance of tool 19, and the two tools being of slightly different length in order that the rear tool 19 will cut a little deeper into the surface of the stone. The set of tools operating upon the right-hand upper surface of the stone is shown in section in Fig. 5 and in perspective in Fig. 6, and in this instance, the set consists of three tools, the intermediate tool 21 lying in the same vertical plane as its shank portion, and the other two tools 20, 22, having offsets adjacent their shank portions to position them somewhat in advance of and rearwardly of, respectively, the intermediate tool 21. In this instance, the tools are also of varying length, the forward tool 20 being somewhat shorter than the intermediate tool 21, and the rear tool 22 being somewhat longer than the intermediate tool whereby each tool will effect a slightly deeper cut in the face of the stone.

The left-hand side face of the stone is cut or dressed by a tool 23 having a comparatively long shank secured in frame 12 and the right-hand side face of the stone, as viewed in Figs. 1 and 3, is cut or dressed by tools 24, 25, mounted in the support 13, the tools 25 being of a slightly greater length than the tool 24, so as to cut a little deeper into the surface of the stone. In connection with tool 24 is will be noted that the cutting edge thereof is notched as at 26a. In addition, with multiple tools of this type, the cutting edge may also be formed slightly concave laterally of the tool face. For instance, as more particularly illustrated in Fig. 9, the cutting edge of tool 24 is made concave by having the side portions 27 thereof of slightly greater depth than the intermediate portion. This concave cutting edge tends to cause the chippings to break inwardly and prevents breaking off of the stone beyond the pattern line while, at the same time, it permits a heavier feed of the stone so as to materially reduce the time required for completing the shaping operation. With this arrangement of multiple tools and, particularly, with tools operating upon the three surfaces of the stone which are to be cut or shaped, the cutting and shaping of the stone can be effected with a considerable saving of time due to the fact, primarily, that with the tools of each set arranged in tandem formation relatively to the direction of movement of the stone, one passage of the stone past the tools is the equivalent of moving the stone relatively to a single tool a number of times equal to the number of tools in a set.

In order to insure against chipping or fracturing of the face of the stone to a depth below or beyond the proposed finished surface of the stone, one or more of the forward tools of each set may be provided with recesses 26. For instance, in connection with the tools 18 and 19, tool 18 is formed with a plurality of such recesses or notches and, where three tools are used in a set, as illustrated in Fig. 6, both the forward and intermediate tools may be provided with these recesses. However, in each instance, the rear tool of the set should have an uninterrupted cutting edge and, where two or more tools of a set are provided with the notches, the notches of one tool in the set should be staggered laterally with respect to the notches in the other notched tools of the set. The provision of these notches in the cutting edges of the tools, causes the stone chips to crumble and does away with all danger of having the surface of the stone chipped off beyond the line of the pattern and, consequently, the operator is enabled to take off more rough at each trip of the planer bed, thus further cutting down the cost of fabrication or shaping of the stone.

This multiple tool arrangement wherein the tools are placed in tandem relationship will effect a saving of between 25% and 50% of the time ordinarily required in planing or cutting stones to various patterns. The number of tools required may depend somewhat upon the nature of the design. For instance, for plain ashlar facing, two tools arranged so that the rear one will cut a little deeper than the forward one may be used, whereas for washes or splayed surfaces, two or three tools can be used, with the first, or first and second, tools notched to break up and crumble the stone. To prevent accumulation of chips between closely placed tools, an air hose (not shown) may be inserted to blow away any surplus waste from the cutting edges of the tools, but this is seldom, if ever, necessary except when the stone is wet and mushy. In addition, with the present machine and its tooling, there is 10% to 35% saving in power cost for the same amount of cubic feet planed, on account of reducing the number of trips of the planer. Also, more accurately moulded work is produced with the present machine because the tools are in the same positions not only for the first stone planed, but for all the following pieces, as distinguished from the prior practice which consists in first sizing each stone to correct dimensions and then replacing the sizing tools with the moulding tools—an operation which must be repeated for every stone planed.

What I claim is:

1. In a stone cutting apparatus, the combination of a tool support, two sets of tools fixed in said support and spaced apart to engage the upper surface of a stone adjacent opposite edges of the stone, a tool fixed in said support intermediate said two sets of tools, the side edges of said intermediate tool projecting laterally beyond the contiguous edges of the tools of said two sets, and a set of raglet tools mounted in the support rearwardly of said intermediate tool, the tools of each set being arranged in tandem formation with each tool of greater depth than the tool in advance thereof.

2. In a stone cutting apparatus, the combination of a traveling planer bed adapted to support a stone slab, a support positioned above said bed, two sets of planer tools fixed in said support adapted to engage the top surface of said slab at opposite side edges thereof, the tools of each set being arranged in tandem longitudinally of the bed with each tool of each set of greater depth than the tool in advance thereof, a tool fixed in said support intermediate said two sets of tools, the cutting edge of said intermediate tool laterally overlapping the side edges of said sets of tools, a raglet tool fixed in said support at the rear of said intermediate tool, and a side face cutting tool fixed in said support with its cutting edge positioned to engage a side face of a slab on the bed.

3. In a stone cutting apparatus, the combination of a traveling planer bed adapted to support a stone slab, a support positioned above said bed, two sets of planer tools fixed in said support adapted to engage the top surface of said slab at opposite side edges thereof, the tools of each set being arranged in tandem longitudinally of the bed with each tool of each set of greater depth than the tool in advance thereof, a tool fixed in said support intermediate said two sets of tools, the cutting edge of said intermediate tool laterally overlapping the side edges of said sets of tools, a raglet tool fixed in said support at the rear of said intermediate tool, a side face cutting tool fixed in said support with its cutting edge positioned to engage a side face of a slab on the bed, a second tool support, and a pair of side face cutting tools fixed in said second support and arranged in tandem in position to engage the opposite side face of said slab.

4. In a stone cutting apparatus embodying a traveling planer bed and a tool support, a set of planer tools fixed in said support and arranged in spaced tandem relationship longitudinally of the direction of movement of said bed, the forward tool having a cutting edge of generally concave formation laterally of the tool, the side edge portions of said cutting edge being of greater depth than the intermediate portion thereof whereby chippings from the face of the stone operated upon will tend to break inwardly with respect to the side edges of the tool.

5. In a stone cutting apparatus embodying a traveling planer bed and a tool support, a set of planer tools fixed in said support and arranged in spaced tandem relationship longitudinally of the direction of movement of said bed, the forward tool having a cutting edge of generally concave formation laterally of the tool, the intermediate portion of said edge being substantially plane and having recesses formed therein, and the end portions of said cutting edge being of greater depth than said intermediate portion whereby chippings from the face of the stone operated upon will tend to break inwardly with respect to the side edges of the tool.

GUSTAVE A. SWENSON.